(12) United States Patent
Konishi et al.

(10) Patent No.: US 7,226,376 B2
(45) Date of Patent: Jun. 5, 2007

(54) HYDRAULIC TENSIONER

(75) Inventors: Tatsuya Konishi, Osaka (JP); Atsushi Kumakura, Osaka (JP); Atsushi Kawano, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 458 days.

(21) Appl. No.: 10/857,813

(22) Filed: Jun. 1, 2004

(65) Prior Publication Data

US 2005/0014587 A1 Jan. 20, 2005

(30) Foreign Application Priority Data

Jul. 14, 2003 (JP) .............................. 2003-274079

(51) Int. Cl.
*F16H 7/08* (2006.01)

(52) U.S. Cl. ..................................................... 474/110

(58) Field of Classification Search ................. 474/101, 474/109, 110, 111
See application file for complete search history.

(56) References Cited

U.S. PATENT DOCUMENTS 6,086,497 A * 7/2000 Fukuda et al. ............... 474/110
2002/0022541 A1* 2/2002 Ullein et al. ................. 474/110

FOREIGN PATENT DOCUMENTS

JP 3054068 4/2000

* cited by examiner

*Primary Examiner*—Vicky A. Johnson
(74) *Attorney, Agent, or Firm*—Howson & Howson LLP

(57) ABSTRACT

In a hydraulic tensioner, an oil pressure control recess, at a proximal end of a cylindrical, plunger-receiving hole, receives from an oil supply, and also receives oil which oozes past a check valve and an inner sleeve inside the plunger, thereby returning the oil, which would leak to the outside in a conventional hydraulic tensioner, to the interior of the plunger.

1 Claim, 5 Drawing Sheets

HYDRAULIC TENSIONER

FIELD OF THE INVENTION

This invention relates to a tensioner for applying tension to a chain or belt used as a transmission medium for transmitting power between a crankshaft and a camshaft in the timing system of an internal combustion engine.

BACKGROUND OF THE INVENTION

As shown in FIG. 5, a conventional hydraulic tensioner 500 comprises a plunger 510 having a hollow portion 511 with a closed end 511b, and open toward the inside of the tensioner. The plunger 510 fits into a cylindrical hole 520 in a tensioner housing 520, and is extensible and retractable in the tensioner housing so that it can maintain engagement with a timing chain. An oil passage 522 allows oil, supplied under pressure from an oil source, to communicate with the cylindrical hole 521. A check valve block 530, which is slidably fitted into the cylindrical inner surface 511a of hollow portion 511, allows oil to flow toward the closed end 511b of the plunger 510. A spring 540, interposed between the check valve block 530 and the closed end 511b, biases the plunger forward, and at the same time holds the check valve block against a sleeve 550, which is seated on an end portion 523a of a hole 523 in the plunger. Hole 523 has a diameter d2 which is smaller than the diameter d1 of the cylindrical hole 521. The check valve block 530 is thus held at a fixed position in the tensioner housing 520 although it is slidable relative to the inner circumferential surface 511a of the plunger 510.

In the conventional hydraulic tensioner 500, the oil passage 522 communicates with an internal space IA of the inner sleeve 550, which functions as an oil reservoir. The oil fills a high pressure chamber HA between the closed end 511b of the hollow portion 511, and the check valve block 530, from the inside of the inner sleeve 550, through the check valve block 530. The plunger 510 is always pressed toward the timing chain by the biasing force of the spring 540, to apply chain tension to the chain.

When the plunger 510 is pushed back into the tensioner housing by an impact applied to the plunger through the timing chain, oil in the high pressure chamber HA is discharged through an oil discharge passage 526, which connects the cylindrical hole 521, to the outside of the tensioner housing 520. The oil flows through gaps between the outer circumferential surfaces of the check valve block 530 and inner sleeve 550, and the inner circumferential surface 511a of the plunger, thereby absorbing, and reducing the effect of, the impact force.

The conventional hydraulic tensioner 500 is disclosed at page 1, and shown in FIG. 1, of Japanese Patent No. 3054068. The conventional tensioner must be subjected to secondary machining to form the oil discharge passage 526, and fine secondary machining to form an oil supply opening 551, which provides for fluid communication between the oil passage 522 and the interior of the inner sleeve 550. The requirement for secondary machining resulted in a significant increase in the time and cost for manufacturing the conventional tensioner. Another problem encountered in the operation of the tensioner was that oil tended to adhere to and clog the oil discharge passage 526 and the oil supply opening 551, especially after the tensioner was in use for a long period of time. The clogging of these passages can result in unstable operating conditions, that cannot be easily remedied.

Another problem with the conventional tensioner was that a significant amount of oil was consumed as a result of discharge through passage 526 when impact forces were encountered. Thus, the engine oil pump was required to have sufficient power to supply oil to the tensioner under varying conditions. Moreover, when the engine is stopped, the engine oil pump also stops, but the discharge of oil from the tensioner cannot be avoided. Under such conditions, the amount of oil in the tensioner body 520 tends to be inadequate when the engine is restarted, and the tensioner cannot properly accommodate impact forces applied through the timing chain until the interior of the tensioner is re-charged with oil. Accordingly, wobbling of the timing chain occurs as the engine is started, producing noise known as a "wobbling sound."

The objects of the invention are to solve the problems of the conventional hydraulic tensioner; to provide a hydraulic tensioner which is simpler in construction, and can be manufactured in a shorter time and at a lower cost; to suppress the consumption of oil by the tensioner; to achieve stable application of tension; and to eliminate wobbling sounds in the timing transmission medium upon starting of an engine.

SUMMARY OF THE INVENTION

The hydraulic tensioner according to the invention comprises a tensioner housing having a cylindrical hole and a hollow plunger having a closed end and a cylindrical interior circumferential surface. The plunger fits slidably in the cylindrical hole and is open toward the inside of the tensioner housing. The plunger projects from the housing and is engageable with a timing transmission medium. An oil passage extends from the exterior of the housing and communicates with an interior space within the cylindrical hole in the interior of the housing, for delivering oil under pressure from an oil supply. A check valve block, fits slidably within the plunger, and allows oil to flow into the part of interior of the plunger on the side of the check valve block adjacent the closed end of the plunger. A spring, disposed in compression between the closed end of the plunger and the check valve block, biases the plunger in the projecting direction. An inner sleeve, seated on a proximal end portion of the cylindrical hole and engaged with the check valve block, holds the check valve block at a fixed position in the tensioner housing. The inner sleeve fits slidably in the plunger. A gap exists between the check valve block and the inner circumferential surface of the plunger, and another gap exists between the inner sleeve and the inner circumferential surface of the plunger. An oil pressure control recess is formed at a proximal end of the cylindrical hole of the tensioner housing adjacent the seated end of the inner sleeve. This oil pressure control recess is in communication with the cylindrical hole, the oil passage and the gaps. In operation of the tensioner, oil oozing through the gaps from the interior of the plunger is returned, along with oil supplied through the oil passage, to the interior of the plunger through the check valve block.

The oil pressure control recess circulates oil which oozes under high pressure through the gaps from the space within the plunger adjacent the closed end thereof. The pressure control recess can be simultaneously molded or cast together with the cylindrical hole in the housing. The use of the pressure control recess allows realization of a simpler tensioner construction, without the need for secondary machining or cutting of the tensioner housing or of an inner sleeve as in the conventional case. Thus the manufacturing man-hour and manufacturing costs can be significantly reduced. Moreover, clogging of oil, which tends to occur in a conventional hydraulic tensioner, can be avoided and stable application of tension over a long period of time can be attained.

The provision for return of oil from the interior of the plunger to the oil pressure control recess, reduces the consumption of oil remarkably. Moreover, the tensioner allows for a reduction of the discharge capacity of the engine oil pump.

The tensioner construction ensures that sufficient oil is present in the tensioner even upon engine start-up. Accordingly impact forces exerted by the timing transmission medium are absorbed immediately, and wobbling sounds are suppressed.

DETAILED DESCRIPTION OF THE PREFERRED EMBODIMENTS

The tensioner housing used in accordance with the invention may be composed of any of a variety of materials including plastics, i.e., a synthetic resin, aluminum, and cast iron. In a case of a tensioner housing made of plastics, for example, the oil pressure control recess can be molded during injection molding of the tensioner housing without the need for additional cutting or machining. In the case of cast iron or aluminum tensioner housing, the oil pressure control recess can also be simultaneously molded during the casting of the tensioner housing, without additional cutting or machining.

The oil pressure control recess, which is formed in the tensioner housing make take any of a wide variety of forms provided that they can return oil under high pressure from the inside of the plunger to the oil passage while communicating with the proximal end the cylindrical hole and the oil passage. The recess may take any shape or size allowed by the tensioner housing.

Figure 1:
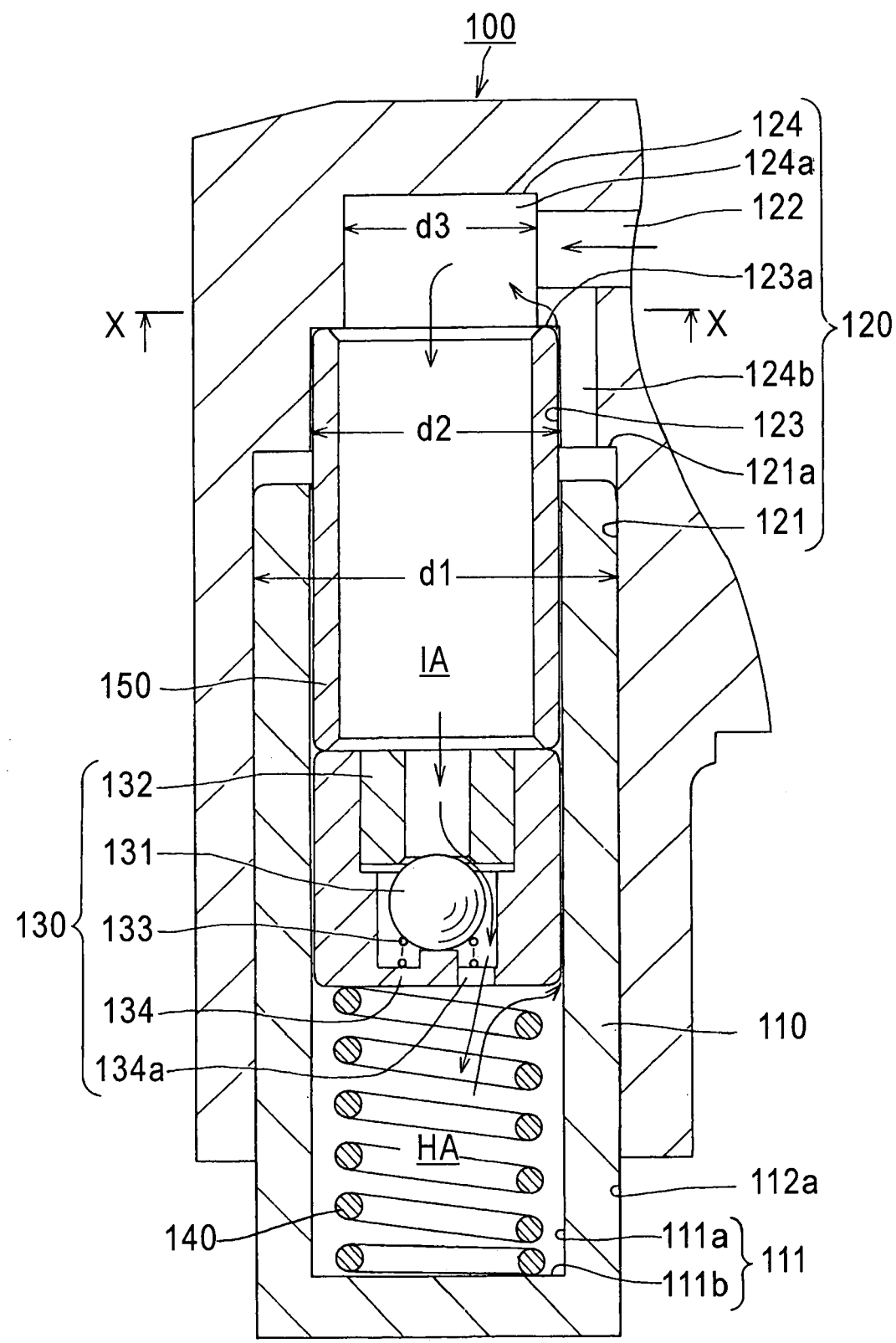
FIG. 1 is a cross-sectional view of a hydraulic tensioner in accordance with a first embodiment of the invention.

The hydraulic tensioner 100 shown in FIG. 1 comprises a hollow plunger 110 having a closed end 111 and open toward the inside of the tensioner. A housing 120 has a cylindrical hole 121. The plunger is retractable in the cylindrical hole, and extensible toward a timing chain (not shown). An oil passage 122 allows oil, supplied under pressure by an engine oil pump (not shown) to communicate with the cylindrical hole 121. A check valve block 130, which allows the oil to flow toward the closed end of the plunger, is disposed within the hollow portion 111 of the plunger, and fits slidably with respect to the inner circumferential surface of the plunger. A spring 140, which is in compression between the check valve block 130 and the closed end 111$b$ of the plunger, biases the plunger 110 forward. An inner sleeve 150 seats on a proximal end portion 123$a$ of the cylindrical hole, holding the check valve block 130 at a fixed position in the tensioner housing 120 while being slidable with respect to the inner circumferential surface 111$a$ of the plunger 110. The oil supplied from the engine oil pump flows into the internal space IA of the inner sleeve 150 through the oil passage 122 in the tensioner housing 120. The space 1A serves as an oil reservoir. While part of the oil in space 1A flows through the check valve to fill the high pressure chamber HA, defined between the closed end 111$b$ of the plunger 110 and the check valve block 130, the plunger 110 is biased in the protruding direction toward the timing chain by spring 140 inside the plunger 110.

The outer circumferential surface 112$a$ of the plunger 110 and the cylindrical hole 121 of the tensioner housing 120 have coaxial circumferential surfaces, and the plunger 110 is retractable and extensible with respect to the cylindrical hole 121 of the tensioner housing 120. The inner circumferential surface 111$a$ of the plunger 110, the check valve block 130 and the inner sleeve 150 also have coaxial circumferential surfaces, and the check valve block 130 and the inner sleeve 150 fit slidably with respect to the inner circumferential surface 111$a$ of the plunger 110.

The valve block 130 causes oil, supplied under pressure through the oil passage 122 to the interior of the inner sleeve 150, to flow into the space defined between the check valve block and the closed end 111$b$ of the plunger. The check valve mechanism comprises a check ball 131 disposed in the path of the oil, a ball seat 132, engageable by the ball, a spring 133, which urges the check ball 131 into contact with the seat 132, and a retainer 134, which holds the spring 133, and maintains the ball in close proximity to the seat. The retainer is provided with an oil port 134$a$.

The inner sleeve 150 is seated on a proximal end portion 123$a$ of an inner sleeve retaining hole 123, which has a diameter d2, smaller than the diameter d1 of the cylindrical hole 121. The inner sleeve 150 is held straight by the inner sleeve retaining hole 123 to ensure smooth sliding of the plunger 110.

Next, the oil pressure control recess 124, which is an important feature of the embodiment shown in FIG. 1, is formed simultaneously with the cylindrical hole 121 when the cylindrical hole is molded. The oil pressure control recess 124 is formed so that it provides communication between the proximal end 121$a$ of the cylindrical hole 121 and the oil passage 122, and is adapted to return, to the oil passage 122, oil which oozes under high pressure from the space between the check valve block 130 and the closed end 111 of the plunger. This oil flows through the gaps between the inner circumferential surface 111$a$ of the plunger 110, and the check valve block, and inner sleeve, respectively.

Figure 2:
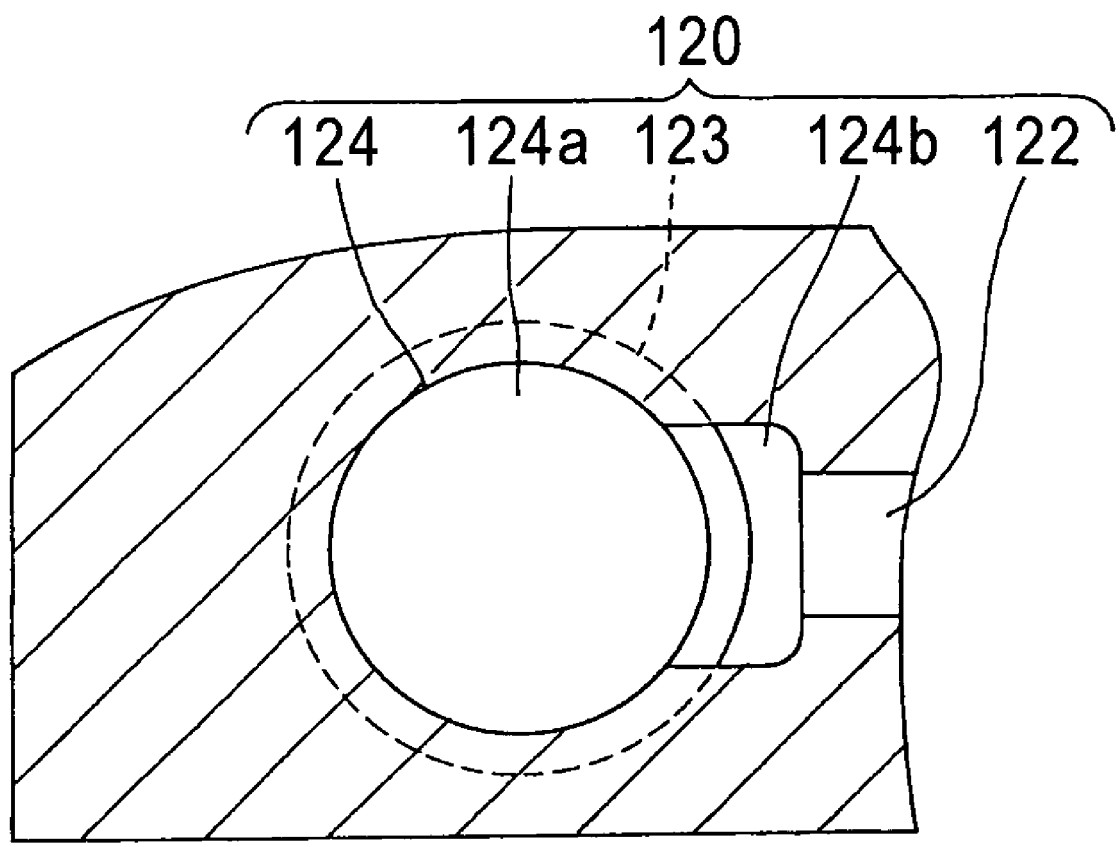
FIG. 2 is a cross-sectional view taken on plane X—X in FIG. 1.

As shown in FIGS. 1 and 2, the oil pressure control recess 124 comprises an oil pressure control region 124$a$ having a diameter d3 smaller than the hole diameter d2 of the inner sleeve retaining hole 123. The oil pressure control recess also has a region 124$b$ for returning oil which oozes under high pressure from the space between 111$b$ of the plunger 110 and the check valve block. This oil returns to the oil pressure control region 124$a$ via a gap between the inner circumferential surface 111$a$ of the plunger 110 and the inner sleeve 150. Thus the returning oil flows into the oil pressure control region together with oil flowing under pressure through the oil passage 122.

The oil pressure control recess 124, which comprising both the oil pressure control region 124$a$ and the region 124$b$, can be molded or cast simultaneously with the cylindrical hole 121 and the inner sleeve retaining hole 123 when the tensioner housing 120 is formed. Additional machining and cutting are not needed.

The oil passage 122 extends in a direction perpendicular to the central axis the cylindrical hole 121.

Figure 5:
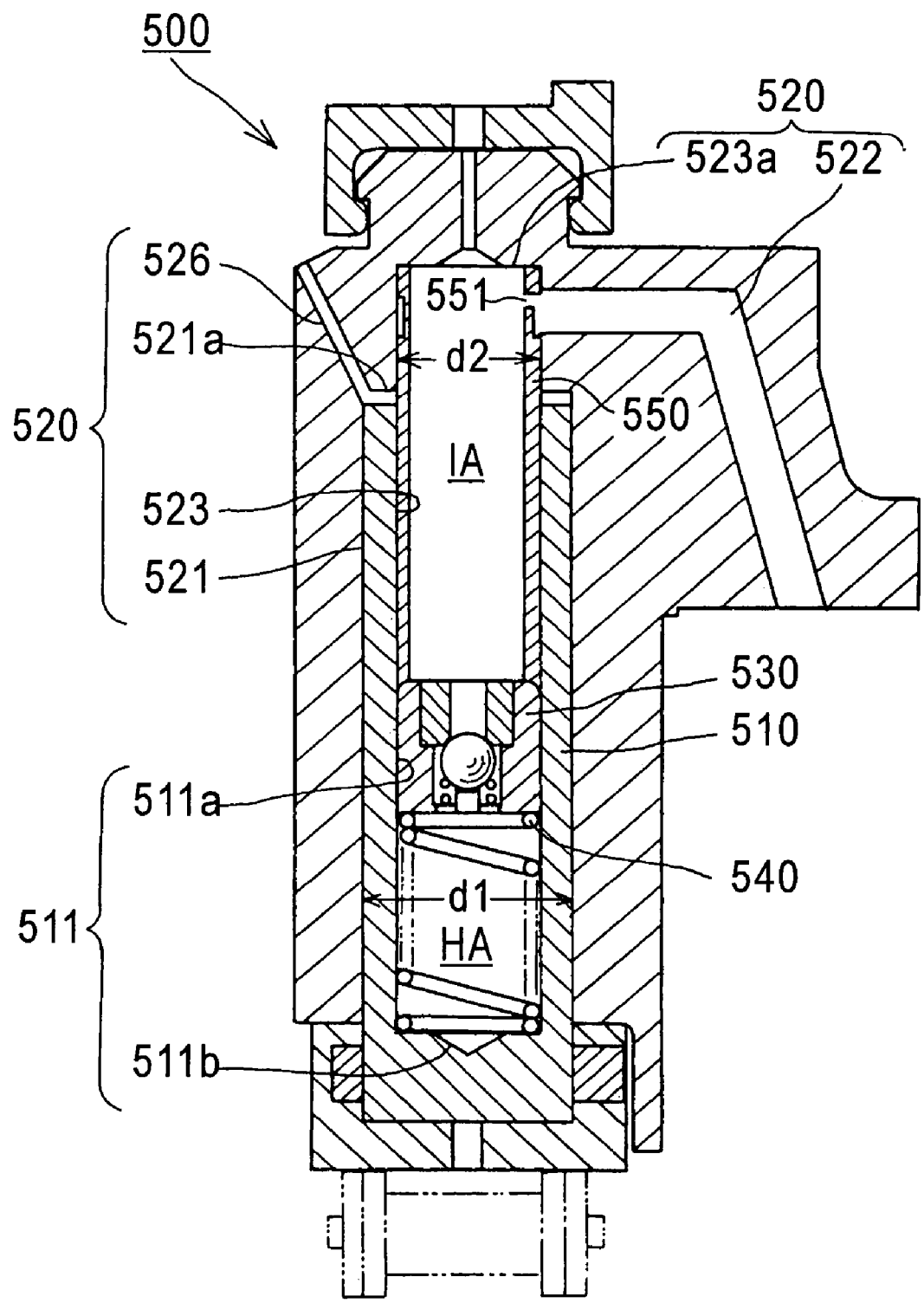
FIG. 5 is a cross-sectional view of a conventional hydraulic tensioner.

Since the oil pressure control recess 124 returns the oil under high pressure from the closed end of plunger 110 toward the oil passage 122, consumption of oil in the tensioner housing 120 is remarkably lower than the oil consumption experienced with the conventional hydraulic tensioner 500 (FIG. 5), which discharges oil to the outside of the tensioner housing. Furthermore, the discharge capacity requirement of the engine oil pump is significantly reduced, since a sufficient amount of oil in the tensioner housing 120 is ensured, even upon restarting of the engine. Consequently, impact forces exerted by the timing chain upon engine start-up are taken up immediately by the tensioner, and the wobbling sounds, which occur when an ordinary tensioner is used, are suppressed.

The tensioner 100 depicted in FIGS. 1 and 2 is structurally simple, and can be produced at reduced cost, utilizing fewer man-hours. Because of its lower manufacturing cost, its ability to reduce oil consumption, and its ability to apply tension in a stable manner and eliminate wobbling sounds on engine start-up, the tensioner is highly advantageous.

Figure 3:
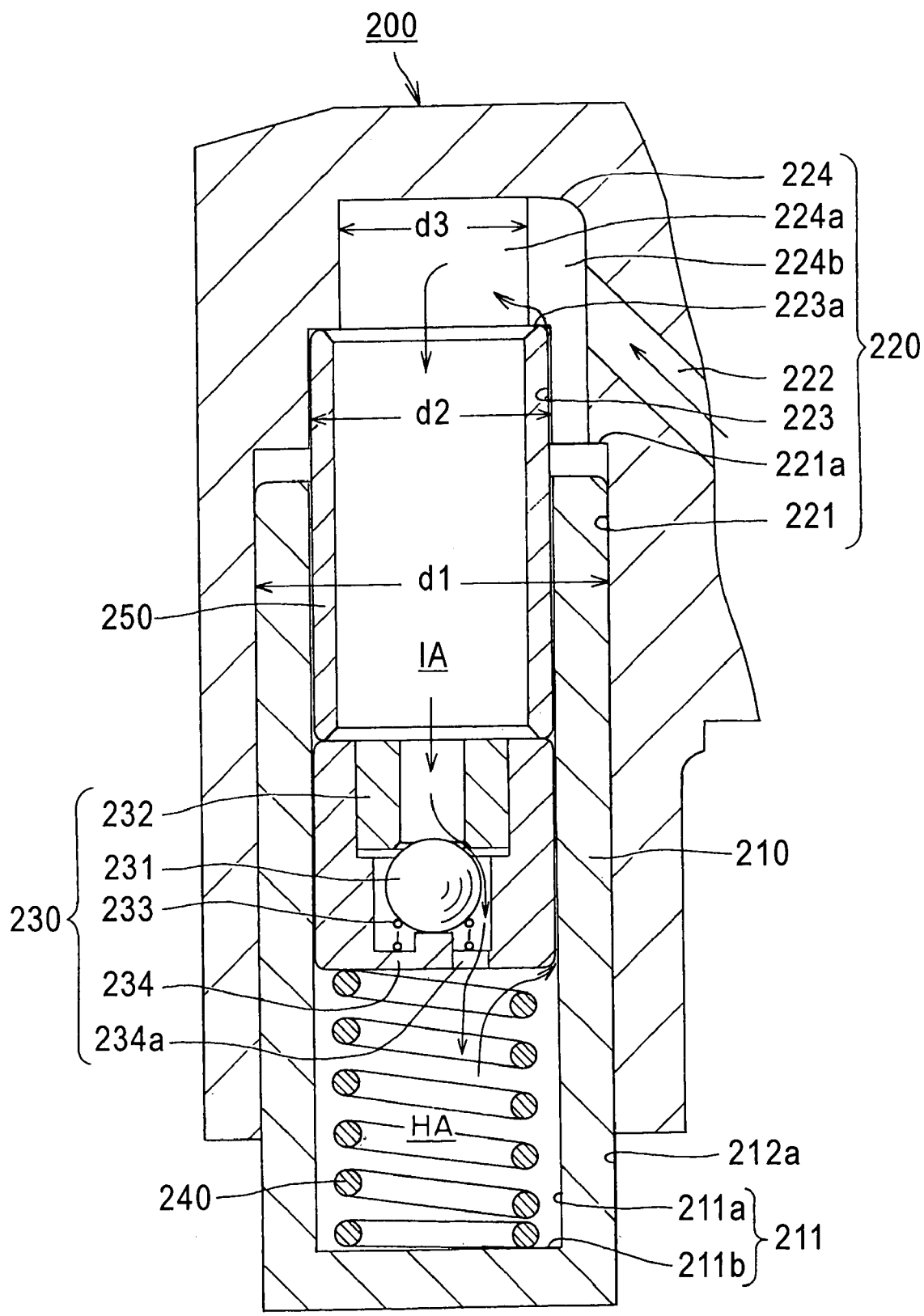
FIG. 3 is a cross-sectional view of a hydraulic tensioner in accordance with a second embodiment of the invention.

The alternative embodiment of the invention, shown in FIG. 3, is similar in many respects to the embodiment shown in FIGS. 1 and 2. The tensioner 200 comprises a hollow plunger 210 having a closed end 211 and open toward the inside of the tensioner. A housing 220 has a cylindrical hole 221. The plunger is retractable in the cylindrical hole, and extensible toward a timing chain (not shown). An oil passage 222 allows oil, supplied under pressure by an engine oil pump (not shown) to communicate with the cylindrical hole 221. A check valve block 230, which allows the oil to flow toward the closed end of the plunger, is disposed within the hollow portion 211 of the plunger, and fits slidably with respect to the inner circumferential surface of the plunger. A spring 240, which is in compression between the check valve block 230 and the closed end 211b of the plunger, biases the plunger 210 forward. An inner sleeve 250 seats on a proximal end portion 223a of the cylindrical hole, holding the check valve block 230 at a fixed position in the tensioner housing 220, while being slidable with respect to the inner circumferential surface 211a of the plunger 210. The oil supplied from the engine oil pump flows into the internal space IA of the inner sleeve 250 through the oil passage 222 in the tensioner housing 220. The space 1A serves as an oil reservoir. While part of the oil in space 1A flows through the check valve to fill the high pressure chamber HA, defined between the closed end 211b of the plunger 210 and the check valve block 230, the plunger 210 is biased in the protruding direction toward the timing chain by spring 240 inside the plunger 210.

The outer circumferential surface 212a of the plunger 210 and the cylindrical hole 221 of the tensioner housing 220 have coaxial circumferential surfaces, and the plunger 210 is retractable and extensible with respect to the cylindrical hole 221 of the tensioner housing 220. The inner circumferential surface 211a of the plunger 210, the check valve block 230 and the inner sleeve 250 also have coaxial circumferential surfaces, and the check valve block 230 and the inner sleeve 250 fit slidably with respect to the inner circumferential surface 211a of the plunger 210.

The valve block 230 causes oil, supplied under pressure through the oil passage 222 to the interior of the inner sleeve 250, to flow into the space defined between the check valve block and the closed end 211b of the plunger. The check valve mechanism comprises a check ball 231 disposed in the path of the oil, a ball seat 232, engageable by the ball, a spring 233, which urges the check ball 231 into contact with the seat 232, and a retainer 234, which holds the spring 233, and maintains the ball in close proximity to the seat. The retainer is provided with an oil port 234a.

The inner sleeve 250 is seated on a proximal end portion 223a of an inner sleeve retaining hole 223, which has a diameter d2, smaller than the diameter d1 of the cylindrical hole 221. The inner sleeve 250 is held straight by the inner sleeve retaining hole 223 to ensure smooth sliding of the plunger 210.

The oil pressure control recess 224 in this embodiment is simultaneously molded together with the cylindrical hole 221. The oil pressure control recess 224 communicates with the proximal end 221a of cylindrical hole 221, and also with the oil passage 222. The recess 224 returns oil, which oozes under high pressure from the closed end portion of the plunger 210 via the gaps between the inner circumferential surface 211a of the plunger 210 and the outer circumferential surfaces of the check valve block 230 and the inner sleeve 250, to the portion of the interior of the tensioner housing which communicates directly with oil passage 222.

The oil pressure control recess 224 comprises an oil pressure control region 224a having a diameter d3 smaller than the diameter d2 of the inner sleeve retaining hole 223. The recess 224 also comprises a region 224b for returning the oil, which oozes from the closed end of the plunger 210 to the oil pressure control region 224a via the gaps surrounding the check valve block and the inner sleeve.

The oil pressure control recess 224, comprising regions 224a and 224b can be simultaneously formed with the cylindrical hole 221 and the inner sleeve retaining hole 223 when the tensioner housing 220 is cast or molded, eliminating the need for additional machining and cutting.

The oil passage 222 is different from passage 122 in the first embodiment in that passage 222 is inclined toward region 224b with respect to the central axis of the cylindrical hole 221 so that oil flowing from region 224b into the oil pressure control region 224a, is biased. The embodiment of FIG. 3 has all of the advantages of the embodiment of FIGS. 1 and 2.

The hydraulic tensioner 300 shown in FIG. 1 comprises a hollow plunger 310 having a closed end 311 and open toward the inside of the tensioner. A housing 320 has a cylindrical hole 321. The plunger is retractable in the cylindrical hole, and extensible toward a timing chain (not shown). An oil passage 322 allows oil, supplied under pressure by an engine oil pump (not shown) to communicate with the cylindrical hole 321. A check valve block 330, which allows the oil to flow toward the closed end of the plunger, is disposed within the hollow portion 311 of the plunger, and fits slidably with respect to the inner circumferential surface of the plunger. A spring 340, which is in compression between the check valve block 330 and the closed end 311b of the plunger, biases the plunger 310 forward. An inner sleeve 350 seats on a proximal end portion 323a of the cylindrical hole, holding the check valve block 330 at a fixed position in the tensioner housing 320 while being slidable with respect to the inner circumferential surface 311a of the plunger 310. The oil supplied from the engine oil pump flows into the internal space IA of the inner sleeve 350 through the oil passage 322 in the tensioner housing 320. The space 1A serves as an oil reservoir. While part of the oil in space 1A flows through the check valve to fill the high pressure chamber HA, defined between the closed end 311b of the plunger 310 and the check valve block 330, the plunger 310 is biased in the protruding direction toward the timing chain by spring 340 inside the plunger 310.

The outer circumferential surface 312a of the plunger 310 and the cylindrical hole 321 of the tensioner housing 320 have coaxial circumferential surfaces, and the plunger 310 is retractable and extensible with respect to the cylindrical hole 321 of the tensioner housing 320. The inner circumferential surface 311a of the plunger 310, the check valve block 330 and the inner sleeve 350 also have coaxial circumferential surfaces, and the check valve block 330 and the inner sleeve 350 fit slidably with respect to the inner circumferential surface 311a of the plunger 310.

The valve block 330 causes oil, supplied under pressure through the oil passage 322 to the interior of the inner sleeve 350, to flow into the space defined between the check valve block and the closed end 311b of the plunger. The check valve mechanism comprises a check ball 331 disposed in the path of the oil, a ball seat 332, engageable by the ball, a spring 333, which urges the check ball 331 into contact with the seat 332, and a retainer 334, which holds the spring 333, and maintains the ball in close proximity to the seat. The retainer is provided with an oil port 334a.

The inner sleeve 350 is seated on a proximal end portion 323a of an inner sleeve retaining hole 323, which has a diameter d2, smaller than the diameter d1 of the cylindrical hole 321. The inner sleeve 350 is held straight by the inner sleeve retaining hole 323 to ensure smooth sliding of the plunger 310.

An oil pressure control recess 324 is simultaneously molded together with the cylindrical hole 321. The pressure control recess 324 communicates with the proximal end 321a of the cylindrical hole 321 and the oil passage 322. The oil pressure control region 324a has a diameter d3 smaller than than the diameter d2 of the inner sleeve retaining hole 323, and can be simultaneously molded together with the hole 321 and the inner sleeve retaining hole 323 when the tensioner housing 320 is cast or molded, without the need for additional machining or cutting.

In this case, the oil passage 322 is different from the previously described embodiments. The passage 322 is inclined toward to the oil pressure control recess 324 with respect to the central axis of the cylindrical hole 321, and extends to the cylindrical pressure control recess 324, meeting the control recess 324 directly, so that there is no region corresponding to regions 124b and 224b in the first two embodiments. The proximal end 323a of hole 323 is interposed by a short distance into passage 322. Thus, oil, which oozes under high pressure via the gaps surrounding the plunger 310 and the inner sleeve 350, is returned directly to a part of the passage 322 which is adjacent the pressure control region 324a, and from there to the pressure control region.

This embodiment has all of the advantages of the previously described embodiments. That is, the discharge capacity of the engine oil pump can significantly reduced, sufficient oil is ensured in the tensioner housing at engine start-up, and impact forces exerted on the plunger by the timing chain are taken up immediately upon starting of the engine, and wobbling sounds, are suppressed.

Figure 4:
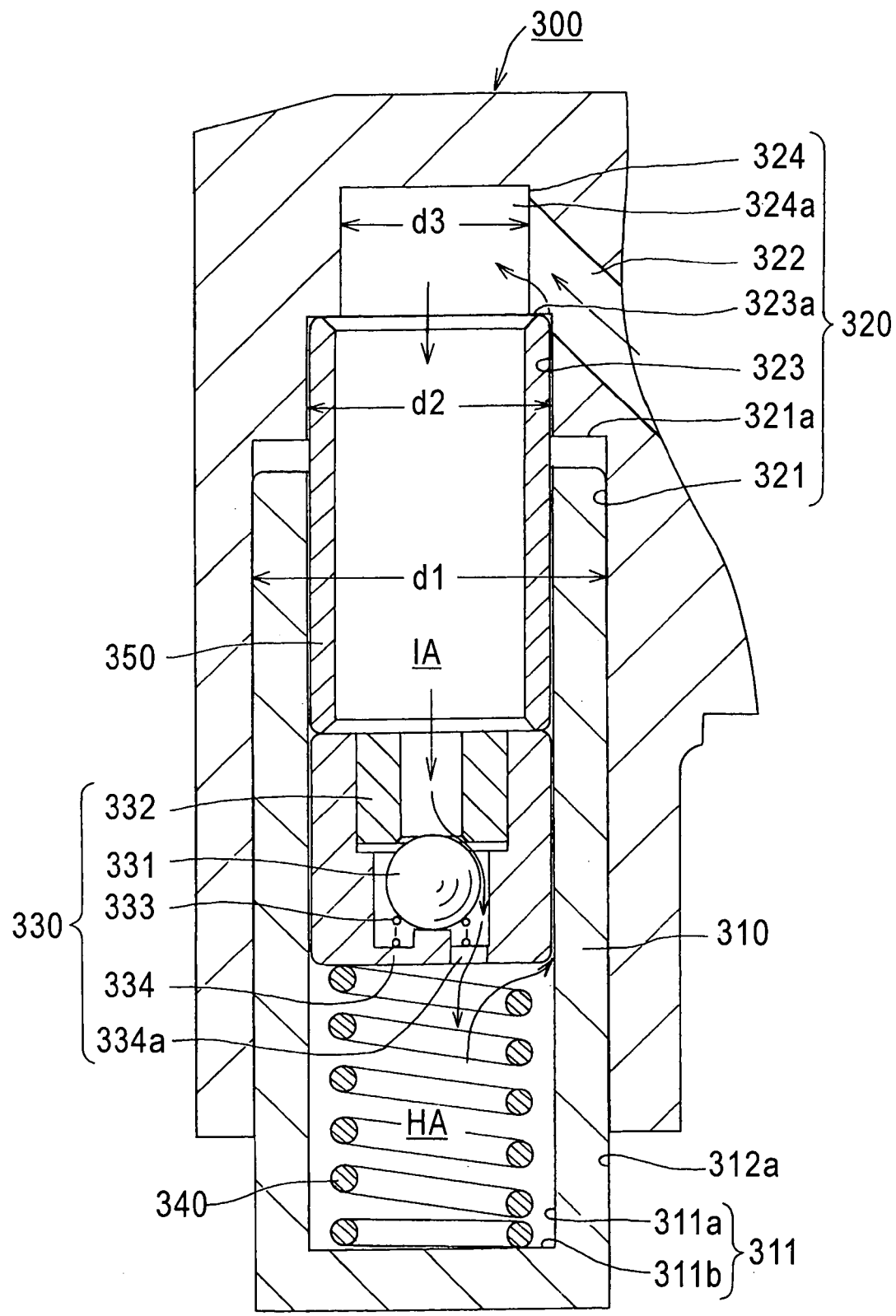
FIG. 4 is a cross-sectional view of a hydraulic tensioner in accordance with a third embodiment of the invention.

In addition, as in the case of the embodiments of FIGS. 1–3, the tensioner of FIG. 4 can contribute to reduced oil consumption

We claim:

1. A hydraulic tensioner comprising:
   a tensioner housing having a cylindrical hole;
   a hollow plunger having a closed end and a cylindrical interior circumferential surface, said plunger fitting slidably in said cylindrical hole and being open toward the inside of the tensioner housing, said plunger projecting from the housing and being engageable with a timing transmission medium;
   an oil passage extending from the exterior of the tensioner housing and communicating with an interior space within said cylindrical hole in the interior of said housing, for delivering oil under pressure from an oil supply;
   a check valve block, fitting slidably within said plunger, for allowing oil to flow into the part of interior of the plunger on the side of the check valve block adjacent the closed end of the plunger;
   a spring, disposed in compression between the closed end of the plunger and the check valve block, for biasing the plunger in the projecting direction; and
   an inner sleeve, seated on a proximal end portion of the cylindrical hole and engaged with the check valve block, the spring also exerting a force against the check valve block in a direction opposite to said projecting direction, said force urging the check valve block against the inner sleeve and thereby holding the check valve block at a fixed position in the tensioner housing, said inner sleeve having an interior passage, and fitting slidably in the plunger, there being a gap between the check valve block and the inner circumferential surface of the plunger, and a gap between the inner sleeve and the inner circumferential surface of the plunger;
   wherein an oil pressure control recess is formed at a proximal end of the cylindrical hole of the tensioner housing adjacent the seated end of the inner sleeve, said oil pressure control recess is in communication with said cylindrical hole, and the check valve block and the inner sleeve, in cooperation with the inner circumferential surface of the plunger, and the tensioner housing, define a flow passage confining substantially all of the oil oozing through said gaps from the interior of the plunger to a path, within the tensioner housing, along which it is returned, with oil supplied through said oil passage, to the interior of the plunger through the oil pressure control recess, the interior passage of the inner sleeve, and the check valve block.

* * * * *